: 
United States Patent [19]

Whipple

[11] Patent Number: 5,161,372
[45] Date of Patent: Nov. 10, 1992

[54] EXHAUST GAS COOLING VALVE

[75] Inventor: Roger B. Whipple, Grayslake, Ill.

[73] Assignee: Outboard Marine Corporation, Waukegan, Ill.

[21] Appl. No.: 610,033

[22] Filed: Nov. 7, 1990

[51] Int. Cl.5 .................. F01N 3/04; F16K 15/02; F16K 31/122
[52] U.S. Cl. .................. 60/310; 60/312; 137/505.13
[58] Field of Search .............. 60/310, 273, 314, 312; 137/505.13, 484.2, 498, 503, 517, 538, 540, 81.2, 81.1

[56] References Cited

U.S. PATENT DOCUMENTS

| | | | |
|---|---|---|---|
| 942,112 | 12/1909 | Sprecher | 137/503 |
| 1,063,164 | 5/1913 | McCumber et al. | 137/505.13 |
| 1,662,097 | 3/1928 | Andersen | |
| 2,864,400 | 12/1958 | Wiegel | 137/498 |
| 3,020,707 | 2/1962 | Post et al. | 60/31 |
| 3,052,086 | 9/1962 | Kiekhaefer et al. | 60/31 |
| 3,088,487 | 5/1963 | Peters | 137/503 |
| 3,138,174 | 6/1964 | Gilpin | 137/503 |
| 3,385,052 | 5/1968 | Holtermann et al. | 60/30 |
| 4,350,010 | 9/1982 | Yukishima | 60/310 |
| 4,920,745 | 5/1990 | Gilbert | 60/273 |

Primary Examiner—Ira S. Lazarus
Assistant Examiner—L. Heyman
Attorney, Agent, or Firm—Michael, Best & Friedrich

[57] ABSTRACT

A valve having a housing including an inlet, an outlet, an internal passage connecting the inlet and the outlet, a pressure responsive member movably supported by the housing for opening and closing the internal passage, and a spring located between the member and the inlet for biasing the member away from the inlet.

20 Claims, 2 Drawing Sheets

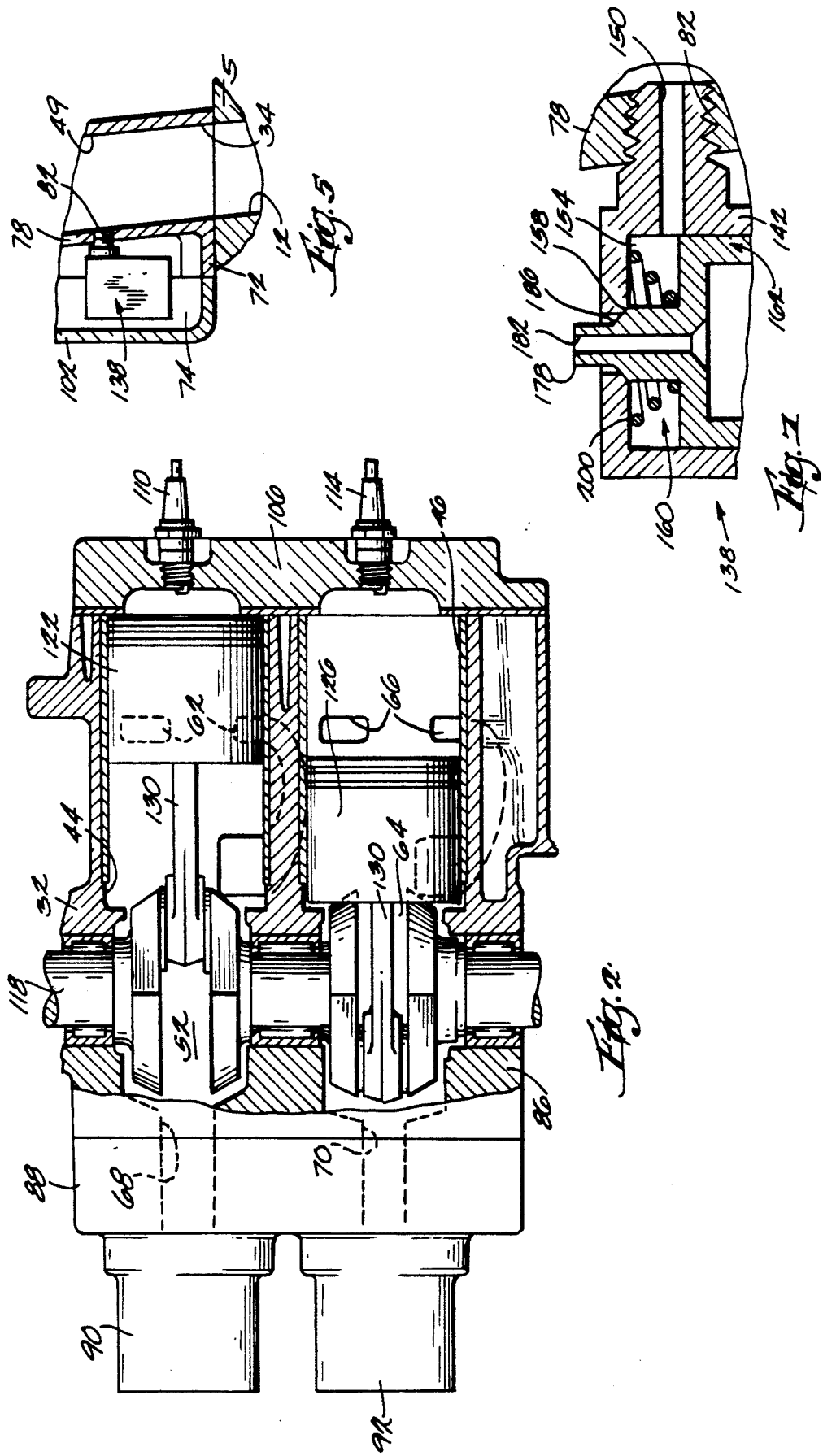

EXHAUST GAS COOLING VALVE

BACKGROUND OF THE INVENTION

1. Field of the Invention

This invention relates to internal combustion engines, and particularly to arrangements for introducing cooling water into the exhaust gases of internal combustion engines. This invention also relates to valves, and more particularly, to pressure relief valves.

2. Description of the Prior Art

It is known to provide an engine with a restricted passage through the wall separating an exhaust passage and a water jacket in order to inject cooling water into the exhaust passage.

Relief valves which provide relief to a fluid system in response to a predetermined pressure generally tend to employ a valve body, a valve seat, and a spring biasing the valve body against the valve seat. The pressure setting at which the valve body unseats is commonly determined by compressing the biasing spring for the valve to a desired degree.

Attention is directed to the following United States Patents:

| U.S. Pat. No. | Inventor | Issued |
|---|---|---|
| 3,052,086 | Kiekhaefer et al. | September 21, 1982 |
| 3,385,052 | Holtermann et al. | May 28, 1968 |
| 4,350,010 | Yukishima | September 21, 1982 |

SUMMARY OF THE INVENTION

The invention provides an internal combustion engine comprising a cylinder block defining a cylinder bore, and an exhaust passageway communicating with the cylinder bore, and means for injecting cooling fluid into the exhaust passageway only at low engine speeds.

The invention also provides a valve assembly adapted to be positioned between a coolant passageway and an exhaust passageway in an internal combustion engine, the assembly comprising a housing including an inlet adapted to communicate with the coolant passageway, an outlet adapted to communicate with the exhaust passageway, an internal passage connecting the inlet and the outlet, and means for opening and closing the internal passage.

The invention also provides a valve comprising a housing having an inlet, an outlet, and an internal passage connecting the inlet and the outlet, a pressure responsive member movably supported by the housing for opening and closing the internal passage and spring means located between the member and the inlet for biasing the member away from the inlet.

The invention also provides an internal combustion engine comprising a cylinder block defining a cylinder bore, an exhaust passageway communicating with the cylinder bore, a coolant passageway and a valve assembly including a housing including an inlet communicating with the coolant passageway, an outlet communicating with the exhaust passageway, an internal passage communicating between the inlet and the outlet, and means for opening and closing the internal passage.

A principal feature of the invention is a pressure or speed responsive valve located between the coolant supply and the exhaust passage of an internal combustion engine to automatically control the flow of coolant to the exhaust passage.

Another principal feature of the invention is a pressure or speed responsive valve located between the coolant supply and the exhaust passageway of an internal combustion engine, which valve will allow coolant into the exhaust passageway at low pressures or speeds and will cut off the supply of coolant to the exhaust passageway at high pressures or speeds.

Other principal features and advantages of the invention will become apparent to those skilled in the art upon review of the following detailed description, claims and drawings.

BRIEF DESCRIPTION OF THE DRAWINGS

FIG. 2 is an enlarged elevational view, partially in section, of the internal combustion engine;

FIG. 5 is a view taken along line 5—5 in FIG. 3;

FIG. 7 is a further enlarged, sectional view of the valve in a closed condition.

Figure 3:
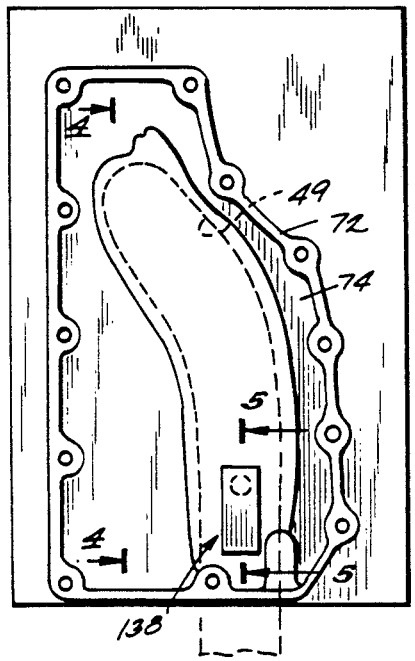
FIG. 3 is a side elevational view of the internal combustion engine with the water jacket cover removed.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DESCRIPTION OF THE PREFERRED EMBODIMENT

A marine propulsion device 4 embodying the invention is illustrated in the drawings.

Figure 1:
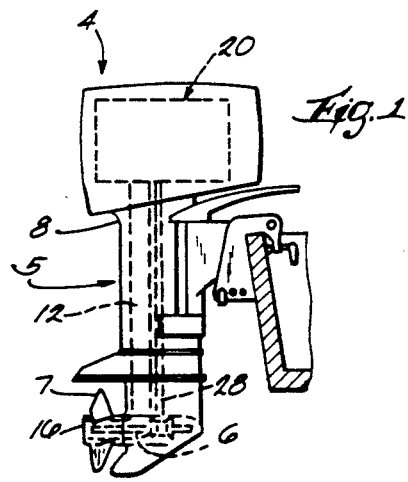
FIG. 1 is a side elevational view of a marine propulsion device embodying the invention and including an internal combustion engine.

The marine propulsion device 4 includes (see FIG. 1) a lower unit 5 including a propeller shaft 6 that supports a propeller 7. The lower unit 5 also includes an upper end 8 and has therethrough an exhaust passageway 12 communicating between the upper end 8 of the lower unit 5 and an exhaust outlet 16 in the propeller 7. Such an exhaust arrangement is known in the art and will not be described in greater detail.

Figure 4:
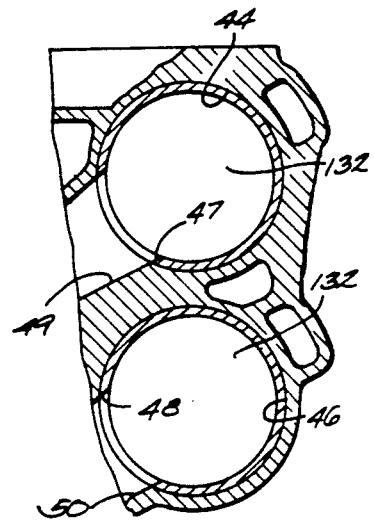
FIG. 4 is a sectional view taken along the line 4—4 of FIG. 3.

The marine propulsion device 4 also includes an engine 20 supported by the upper end of the lower unit 5 and drivingly connected to the propeller shaft 6 by a drive train 28. While the engine 20 could be either a two-cycle engine or a four-cycle engine, the engine 20 is preferably a two-cycle engine. The engine 20 comprises (see FIG. 2) a cylinder block 32 having a lower end having therein (see FIG. 5) a pair of exhaust outlets 34 (one is shown in FIG. 5) communicating with the exhaust passageway 12 in the lower unit 5. The cylinder block 32 defines (see FIG. 4) a pair of cylinder bores 44 and 46 including respective exhaust ports 47 and 48, a first exhaust passageway 49 communicating between the first or upper exhaust port 47 and the exhaust outlet 34 in the lower end of the block 32, and a second exhaust passageway 50 communicating between the second or lower exhaust port 48 and the other exhaust outlet in the lower end of the block 32. The cylinder block 32 partially defines (see FIG. 2) a first crankcase 52 communicating with the first cylinder bore 44 via a plurality of first intake passageways 62, and a second crankcase 64 communicating with the second cylinder bore 46 via a plurality of second intake passageways 66. The block 32 includes (see FIGS. 3 and 5) a wall 72 partially defining a cooling jacket 74 located adjacent the exhaust passageways 49 and 50. As shown in FIG. 5, the cylinder block 32 includes a wall 78 partially defining both the first exhaust passageway 49 and the cooling jacket 74. The wall 78 has therethrough a threaded bore 82, the reason for which is explained below. In the illustrated construction, cooling water is supplied to the cooling jacket by a water pump (not shown) located in the lower unit 5, as is known in the art.

The engine further comprises (see FIG. 2) a crankcase cover 86 which is mounted on the cylinder block 32, which further defines the crankcases 52 and 64, and which includes first and second intake passageways 68 and 70 respectively communicating with the first and second crankcases. The engine 20 further comprises means for supplying combustion air to the intake passages 68 and 70. While various suitable means can be employed, in the preferred embodiment, such means includes (see FIG. 2) an intake manifold 88 mounted on the crankcase cover 86, and first and second carburetors 90 and 92 which are mounted on the intake manifold 88 and which communicate with the first and second intake passages 66 and 70, respectively.

The engine 20 further comprises (see FIG. 5) a cooling jacket cover 102 which is mounted on the wall 72 of the cylinder block 32 and which further defines the cooling jacket 74, and a cylinder head 106 (FIG. 2) which is mounted on the cylinder block 32 and which closes the cylinder bores 44 and 46. The cylinder head 106 supports a pair of spark plugs 110 and 114.

The engine further comprises (see FIG. 2) a crankshaft 118 which is rotatably supported by the cylinder block 32 and the crankcase cover 86, which extends through the crankcases 52 and 64, and which is drivingly connected to the drive train 28. The engine further comprises first and second pistons 122 and 126 which are slideably housed in the first and second cylinder bores 44 and 46, respectively, and which are drivingly connected to the crankshaft 118 by connecting rods 130.

In operation, the pistons 122 and 126 move down (to the left in FIG. 2) in the cylinder bores 44 and 46 and uncover the corresponding exhaust ports 47 and 48. The exhaust gases then pass outwardly through the exhaust passageways 49 and 50. The discharge of the exhaust gases into the exhaust passageways 49 and 50 creates pressure waves which travel along the exhaust passageways 12, 49 and 50 and which return to the exhaust ports 47 and 48.

The timing of the return of these pressure waves can be controlled by injecting a cooling liquid into the gases. The cooling liquid lowers the temperature of the exhaust gases to thereby slow the rate of travel of the pressure waves.

The volume of water introduced into the exhaust passageway gases should be inversely proportional to the speed of the engine 20, so that at low speeds a larger amount of water is injected into the exhaust passageway gases and at high speeds a lesser amount of water is introduced into the exhaust passageway gases. It is desirable to have less or no water introduced into the exhaust passageway gases at high engine speeds because the introduction of water at such speeds may hinder the engine performance.

Figure 6:
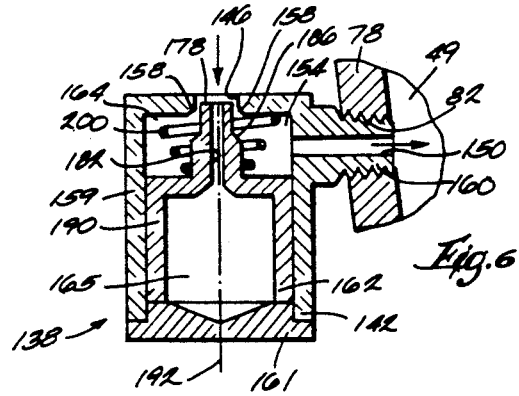
FIG. 6 is an enlarged, sectional view of the valve shown in FIG. 5 in an open condition.

Accordingly, the engine includes valve means communicating between the cooling jacket 74 and the exhaust passageway 49 for injecting cooling water into the exhaust passageway 49 only at low engine speeds. While various suitable valve means can be employed, in the preferred embodiment, such means includes (see FIGS. 5-7) a valve assembly 138.

The valve assembly 138 comprises (see FIG. 6) a housing 142 including an inlet 146 communicating with the cooling jacket 74, an outlet 150 communicating with the exhaust passageway 49, and an internal passage 154 connecting the inlet 146 and the outlet 150. The housing 142 further includes a valve seat 158 surrounding the inlet 146. In the illustrated construction, the housing 142 includes a main portion 159 having an open lower end and partially defining the passage 154. The housing 142 also includes an outlet portion 160 which is threaded into the bore 82, which extends integrally from the main portion 159 and which defines the outlet 150. The housing 142 further includes a base portion 161 that closes the lower end of the main portion 159.

The valve assembly 138 also comprises means for opening and closing the internal passage 154. The opening and closing means preferably includes (see FIG. 6) a valve member 162 which is located in the housing portion 159, which is movable into and out of engagement with the valve seat 158, and which divides the main portion 159 into an upper chamber 164 and a lower chamber 165. The inlet 146 and the outlet 150 communicate with the upper chamber 164, and the internal passage 154 includes the upper chamber 164.

The valve member 162 comprises a stem portion 178 which cooperates with and extends into the inlet 146. The size of the stem portion is such that the area of the portion of the inlet 146 not occupied by the stem portion 178 is substantially equal to the area of the outlet 150. The stem portion 178 preferably has therein an orifice 182 which is calibrated to a predetermined speed or pressure and which communicates between the inlet 146 and the lower chamber 165. The stem portion 178 has thereon a shoulder 186 movable into and out of engagement with the valve seat 158 for opening and closing the inlet 146. The valve member 162 further comprises a main or piston portion 190 that is connected to the stem portion 178 and that is slideably housed by the main portion 159. The valve member 162 is movable relative to the housing 142 along an axis 192 coaxial with the inlet 146. The valve member 162 is movable between a closed position (see FIG. 7) wherein the valve member 162 minimizes the volume of the upper chamber 164 and closes the inlet 146 so that water cannot flow through the passage 154, and an open position (see FIG. 6) wherein the valve member 162 maximizes the volume of the upper chamber 164 and opens the inlet 146 so that water can flow through the passage 154.

The opening and closing means preferably also includes spring means 200 located in the upper chamber 164 between the housing 142 and the valve member 162 for biasing the valve member 162 downwardly or away from the valve seat 158. The spring means 200 thus biases the valve member 162 in the direction maximizing the volume of the upper chamber 164.

During operation, the spring 200 holds the valve member 162 in its open position when the engine is turned off. After the engine is turned on, water will flow through inlet 146, through internal passage 154, and through outlet 150 and into the exhaust passageway 49. The orifice 182 is calibrated such that at the above-mentioned predetermined engine speed, the pressure in chamber 165 will overcome the force of the spring means 200 and cause the valve member 162 to move upwardly and close the inlet 146, thereby preventing water flow into the exhaust passageway 49. Thus, the valve member 162 is pressure responsive in that when the pressure in the lower chamber 165 reaches a predetermined level due to the water flowing through the orifice 182 and into the lower chamber 165, the pressure will force the valve member 162 upward, thereby causing shoulder 186 to contact valve seat 158 and close the inlet 146. The valve member 162 is responsive to engine speed in that the pressure of the water increases as the speed of the engine 20 increases.

Various features of the invention are set forth in the following claims.

I claim:

1. An internal combustion engine comprising a cylinder block defining a cylinder bore, an exhaust passageway located in said cylinder block and communicating with said cyclinder bore, and means for injecting cooling fluid into said exhaust passageway in said cylinder block only at low engine speed and for discontinuing such injection in response to increasing engine speed.

2. An internal combustion engine comprising a cylinder block defining a cylinder bore, a coolant passageway, and an exhaust passageway located in said cylinder block and communicating with said cylinder bore, and means for injecting cooling fluid into said exhaust passageway only at low engine speed and for discontinuing such injection in response to increasing engine speed, said injecting means comprising a valve assembly located in said cylinder block between said coolant passageway and said exhaust passageway.

3. The internal combustion engine of claim 2 wherein said valve assembly comprises a housing including an inlet communicating with the coolant passageway, an outlet communicating with the exhaust passageway, an internal passage connecting said inlet and said outlet, and means for opening and closing said internal passage.

4. An internal combustion engine comprising a cylinder block defining a cylinder bore, an exhaust passageway communicating with said cylinder bore, and a coolant passageway, and a valve assembly located in said cylinder block and including a housing including an inlet communicating with said coolant passageway, an outlet communication with said exhaust passageway, and an internal passage communicating between said inlet and said outlet, and means for opening and closing said internal passage.

5. A valve assembly adapted to be positioned between a coolant passageway and an exhaust passageway in an internal combustion engine block, said assembly comprising a housing including an inlet adapted to communicate with the coolant passageway, an outlet adapted to communicate with the exhaust passageway, and an internal passage connecting said inlet and said outlet, and means for opening and closing said internal passage and including a valve member located in said housing and dividing said housing into a first chamber communicating with said inlet and said outlet and forming a part of said internal passage, and a second chamber opposite to said first chamber, and means located in said first chamber for biasing said valve member in the direction opening said internal passage.

6. The valve assembly of claim 5 wherein said means for opening and closing said internal passage is responsive to engine speed.

7. The valve assembly of claim 5 wherein said valve member has therein a calibrated orifice communicating between said inlet and said second chamber.

8. The valve assembly as set forth in claim 5 wherein said valve member is movable between a closed position wherein said valve member minimizes the volume of said first chamber and closes said inlet, and an open position wherein said valve member maximizes the volume of said first chamber and opens said inlet.

9. The valve assembly as set forth in claim 8 wherein said valve member is movable relative to said housing along an axis, wherein said inlet is located on said axis, and wherein said valve member has a first side partially defining said first chamber and having thereon a stem portion extending into said inlet.

10. The valve assembly as set forth in claim 9 wherein said valve member has an opposite second side partially defining said second chamber, and wherein said stem portion has therethrough a metering passageway communicating between said inlet and said second side of said valve member.

11. The valve assembly as set forth in claim 10 wherein said housing includes a valve seat surrounding said inlet, and wherein said stem portion includes a shoulder movable into and out of engagement with said valve seat for closing and opening said inlet.

12. The valve assembly as set forth in claim 11 wherein said outlet has an area, wherein said inlet has an area, wherein a portion of the area of said inlet is occupied by said stem portion, and wherein the remainder of the area of said inlet is substantially equal to the area of said outlet.

13. The valve assembly of claim 4 wherein said means for opening and closing said internal passage is responsive to engine speed.

14. The valve assembly of claim 4 wherein said valve member has therein a calibrated orifice communicating between said inlet and said second chamber.

15. The valve assembly as set forth in claim 4 wherein said valve member is movable between a closed position wherein said valve member minimizes the volume of said first chamber and closes said inlet, and an open position wherein said valve member maximizes the volume of said first chamber and opens said inlet.

16. The valve assembly as set forth in claim 15 wherein said valve member is movable relative to said housing along an axis, wherein said inlet is located on said axis, and wherein said valve member had a first side partially defining said first chamber and having thereon a stem portion extending into said inlet.

17. The valve assembly as set forth in claim 16 wherein said valve member has an opposite second side partially defining said second chamber, and wherein said stem portion has therethrough a metering passageway communicating between said inlet and said second side of said valve member.

18. The valve assembly as set forth in claim 17 wherein said housing includes a valve seat surrounding said inlet, and wherein said stem portion includes a shoulder movable into and out of engagement with said valve seat for closing and opening said inlet.

19. The valve assembly as set forth in claim 18 wherein said outlet has an area, wherein said inlet has an area, wherein a portion of the area of said inlet is occupied by said stem portion, and wherein the remainder of the area of said inlet is substantially equal to the area of said outlet.

20. A valve comprising a housing having an axis, an inlet which is located on said axis and which has an area, a valve seat surrounding said inlet, an outlet having an area, and an internal passage connecting said inlet and said outlet, a pressure responsive valve member movably supported by said housing for opening and closing said internal passage, said valve member dividing said housing into a first chamber communicating with said inlet and said outlet and forming a part of said internal passage, and a second chamber opposite to said first chamber, said valve member having a first side partially defining said first chamber and having thereon a stem portion which extends into said inlet and which has a shoulder, said valve member having an opposite second side partially defining said second chamber, said stem portion having therethrough a metering passageway communicating between said inlet and said second side of said valve member, a portion of the area of said inlet being occupied by said stem portion, and the remainder of the area of said inlet being substantially equal to the area of said outlet, and said valve member being movable along said axis between a closed position wherein said valve member minimizes the volume of said first chamber and said stem portion shoulder engages said valve seat and closes said inlet, and an open position wherein said valve member maximizes the volume of said first chamber and said stem portion shoulder is spaced from and opens said inlet, and spring means located in said first chamber between said member and said housing for biasing said member away from said inlet.

* * * * *